United States Patent [19]

Tanaka

[11] Patent Number: 4,716,284

[45] Date of Patent: Dec. 29, 1987

[54] PHOTOGRAPHIC OPTICAL SYSTEM HAVING ENHANCED SPECTRAL TRANSMITTANCE CHARACTERISTICS

[75] Inventor: Tsunefumi Tanaka, Kanagawa, Japan

[73] Assignee: Canon Kabushiki Kaisha, Tokyo, Japan

[21] Appl. No.: 709,447

[22] Filed: Mar. 8, 1985

[30] Foreign Application Priority Data

Mar. 12, 1984 [JP] Japan .................................. 59-46853

[51] Int. Cl.$^4$ .............................................. G03B 3/10
[52] U.S. Cl. ...................................... 250/201; 354/403; 354/406
[58] Field of Search .......... 250/201, 201 AF, 201 PF, 250/204; 354/400, 402, 403, 406, 408, 409; 356/4

[56] References Cited

U.S. PATENT DOCUMENTS 4,537,487  8/1985  Taniguchi et al. .................... 354/400
4,561,748  12/1985  Omaki et al. .......................... 354/403

Primary Examiner—Edward P. Westin
Attorney, Agent, or Firm—Toren, McGeady & Associates

[57] ABSTRACT

The disclosed photographic optical system with a focus detector is constructed with an objective lens portion and an optical path splitting surface arranged on the image side thereof. An optical element and an image receiver are successively arranged on one of the split optical paths. A beam source for projecting an object sensing beam in the infrared wavelength region, or a photo-sensor for sensing the reflection of the object sensing beam from an object is arranged on the other split optical path. The spectral transmittance characteristic of the objective lens portion is different from that of the optical element, and is constructed to pass the wavelength region of the object sensing beam. The superimposed characteristic of the spectral transmittance characteristic of the objective lens portion and the spectral transmittance characteristic of the optical element are matched with the sensitivity characteristic of the image receiver.

10 Claims, 9 Drawing Figures

PHOTOGRAPHIC OPTICAL SYSTEM HAVING ENHANCED SPECTRAL TRANSMITTANCE CHARACTERISTICS

BACKGROUND OF THE INVENTION

This invention relates to photographic optical systems with photoelectric focus detectors, and more particularly, to photographic optical systems in which the decrease in either the amount of projection of a beam for measuring the object distance, or in the amount of reception of the reflection thereof is slight, and which have a spectral transmittance characteristic which matches well with the sensitivity characteristic of an image receiver, such as photographic film or a video image pickup device.

Many existing photographic optical systems are equipped with focus detectors of the TTL (through-the-lens) type. A wide variety of arrangements for the focus detection are known, such as placing the photo sensor either in the camera body or in the photographic lens, and mounting the projector either on the front panel of the camera body, or in the photographic lens.

When photoelectrically measuring the distance the greater the received light, the easier to achieve improved accuracy in distance measurement. In the past, however, improved performance of the projection lens has been achieved, but there has been no known approach for considering the spectral transmittance characteristics of the photographic lens.

In general, the spectral transmittance characteristics of photographic lenses are such as to match the sensitivity characteristics of the image receiving means, such as photographic films, decreasing with increase in the wavelength to considerably small values in transmittance, for light whose wavelength is longer than 700 nm and for infrared light, as shown in FIG. 8.

This is particularly true when the photographic lens is of the zoom type. Because the zoom uses a great number of lens elements, an extreme loss occurs in the infrared region. With such a photographic optical system, therefore, when infrared light of about 850 nm is used in distance measurement, an extreme loss in the amount of light results, lowering the ability of distance measurement.

If such light loss is then avoided by modifying the spectral characteristics of the photographic optical system, so that the range of wavelengths in which the transmittance is high is extended up to the infrared region, an alternative problem arises that for color films, since only the red light increases in intensity, reproducibility of the color balance of the photographic optical system is lost.

In the photographic optical system of the TTL type, with a beam splitter arranged in an intermediate space of the system to reflect a projecting beam toward the object, when the reflected light from the object is used for distance measurement, the spectral characteristic of the reflection surface of a beam splitter has a transmittance curve, for example, shown in FIG. 9. For the light coming from the object and entering through the photographic optical system, the reflection surface of such spectral transmittance curve functions as a sharp cut filter, thus giving no contribution to the color rendering of the image.

Another method of correcting the spectral energy on the image plane is by putting a near infrared cut filter on the image side of the beam splitter. In this arrangement, the spectral characteristic of the near infrared cut filter is not significantly different from that shown in FIG. 9. Thus, no contribution is given to the color rendering of the image.

SUMMARY OF THE INVENTION

A first object of the present invention is to provide a photographic optical system with the TTL type arrangement of a photoelectric focus detector of the active type.

A second object is to prevent the measuring light from lessening and to improve the accuracy of distance measurement.

A third object is to provide a photographic optical system by which photographs excellent in color reproduction can be taken.

A fourth object is to provide an apparatus including an optical path splitting surface, arranged in an intermediate location, or space positioned to the rear of a photographic optical system, to split an optical path into two parts, on one of which is provided a distance measuring element and on the other of which is provided an image receiver. The spectral transmittance characteristic of that part of the system, which is common for both photography and distance measurement, is different from that of that part of the system which lies on the image side of the optical path splitting surface. Here, with respect to the wavelength region of an object sensing beam, the spectral transmittance of that part of the system, which lies on the object side of the optical path splitting surface, is larger than that of the other or rear part of the system. Also, the wavelength region for distance measurement is out of coincidence with the center of the range of wavelengths used for the image receiver. Measuring the distance is accomplished through the use of either a beam source of the object sensing beam, or a photo sensor.

DETAILED DESCRIPTION OF THE PREFERRED EMBODIMENTS

Figure 1:
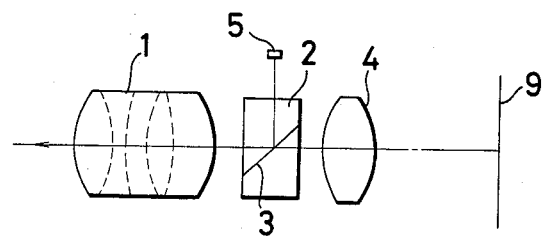
FIGS. 1 to 4 are longitudinal section views of embodiments of optical systems according to the present invention, respectively.

The present invention will next be described in connection with embodiments thereof by reference to the drawings. FIGS. 1 to 4, each illustrate one embodiment of the photographic optical system having the TTL type focus detector according to the present invention, where 1 is a front group of the photographic lens including a plurality of lenses and corresponding to a common optical system for photography and distance measurement. Element 2 is a beam splitter. Element 3 is a wavelength selecting reflection surface or optical path splitting surface including a multi-layer coating which reflects, for example, infrared light, and is permeable to the visible light. Element 4 is a rear group of the photographic lens including a plurality of lenses and corresponding to an optical system solely used for photography. Element 5 is a light source portion constructed so that, for example, only the infrared light radiates. An LED is well suited to the purpose. Element 9 is a sensitive surface of photographic film.

When measuring the distance, an invisible light beam from the light source portion 5 reflects from the reflection source 3, passes through the front group of the photographic lens, and is projected onto a target area. From the projected light beam, the reflected light from the object is received by a photo-sensor 7 outside or inside the photographic lens barrel. Utilizing the output signal from the photo-sensor 7, the object distance is detected and the position of the focusing lens component of the photographic lens is determined. A light bundle from the object passes through the front group 1 of the photographic lens, the reflection surface 3 and the rear group 4 to be focused on the sensitive surface 9.

Figure 2:
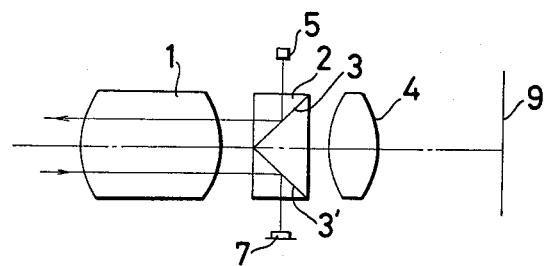

In FIG. 2, the beam splitter 2 is provided with dichroic reflection surfaces 3 and 3' of opposite inclination to each other. In this embodiment, the object sensing beam from the light source portion 5 is reflected from the reflection surface 3 and passes through the front group 1 of the photographic lens to an object (not shown). After reflection therefrom, it passes through the front group 1 in the reverse direction and is reflected from the reflection surface 3' to the photo-sensor 7.

Responsive to a focusing signal from the photo-sensor 7, the front group 1 is partly or entirely moved axially by a drive mechanism (not shown). Thus, focusing of the photographic system is performed. An image of the object is formed with the light bundle passing through the front and rear groups 1 and 4 of the photographic lens on the sensitive surface 9.

Figure 5:
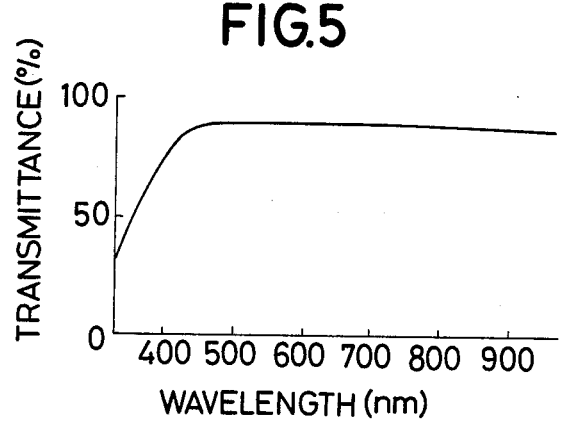
FIGS. 5 and 6, are graphs of spectral transmittance characteristics, respectively.
Figure 6:
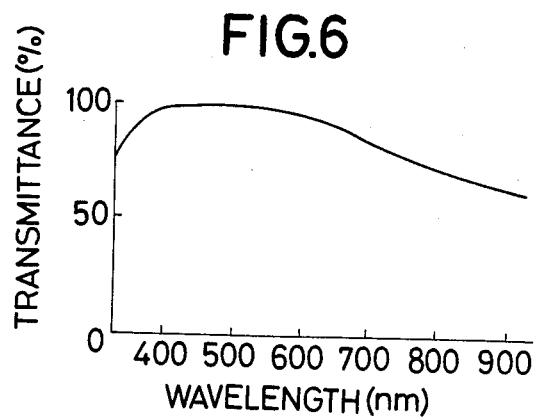

In these embodiments, the front group 1 of the photographic lens has a spectral transmittance characteristic shown in FIG. 5, and the rear group 4 of the photographic lens has a spectral transmittance characteristic shown in FIG. 6.

Figure 3:
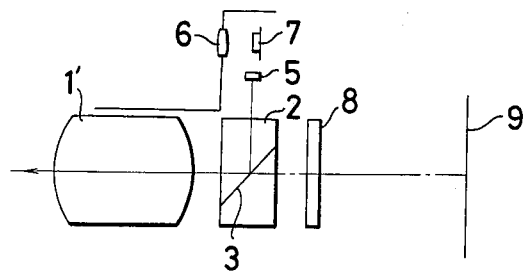
Figure 8:
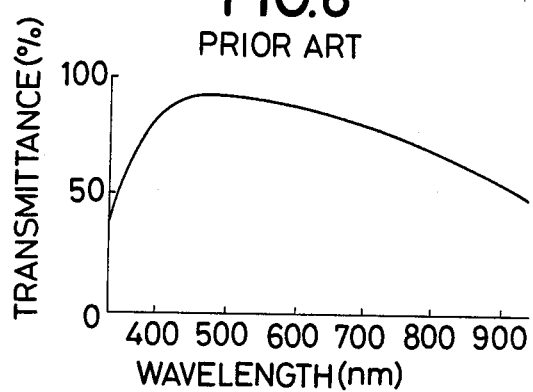
FIGS. 8 and 9, are graphs of the spectral transmittance characteristics of the prior known systems, respectively.
Figure 9:
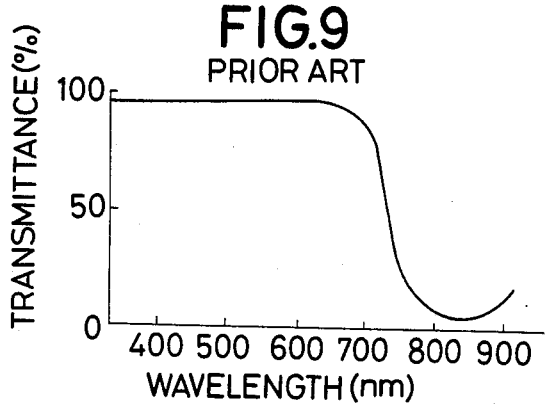

When, as in a photographic lens 1' shown in FIG. 3, there is no lens system arranged to the rear of the beam splitter 2, a filter 8 in the form of a parallel flat plate may be arranged. The spectral transmittance characteristic of the filter 8 is made to lower in transmittance as the wavelength increases, as shown in FIG. 6, so that the overall spectral characteristic of the photographic optical system achieves that shown in FIG. 8. A photographic optical system of good color reproducibility is thus achieved.

In the present invention, the light source portion 5 whose lamp gives off light of a wavelength region within the range of wavelengths 700 to 1000 nm may be comprised solely of the lamp. Otherwise, an infrared filter may be used in combination with the lamp to effect an equivalent result.

Also, the reference numeral 6 of FIG. 3 denotes a convergent lens for collecting light mounted on the casing of the camera, and 7 is a photo-sensor for detecting the reflection of the object sensing beam from the object. Instead of using the filter 8, a coating, as an interference layer, of the characteristic of FIG. 6, may be applied to the rear surface of the beam splitter 2 by deposition techniques.

Figure 4:
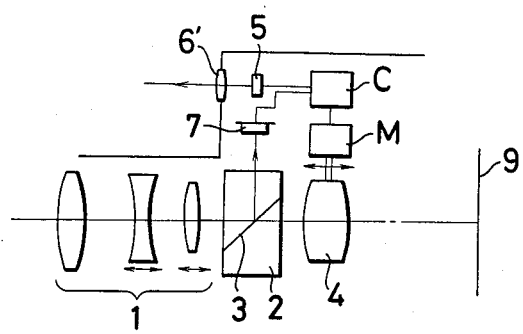

FIG. 4 illustrates a further embodiment where the photo-sensor 7 is arranged in place of the light source 5 of FIG. 1, with the spectral transmittance characteristics of the front group 1 and the rear group 4, as described above. In this embodiment, the front group 1 is a zoom portion including a front lens, a variator and a compensator. The object sensing beam from the light source 5 is directed toward an object by a projection lens 6'. The reflection of the beam from the object passes through the front group 1, is reflected from a half-transparent-mirrored surface 3 of a beam splitter and is received by the photo-sensor 7. The output of the photo-sensor 7 is treated by a signal processing circuit C to operate a drive mechanism M, thereby adjusting the axial position of the rear group 4.

Figure 7:
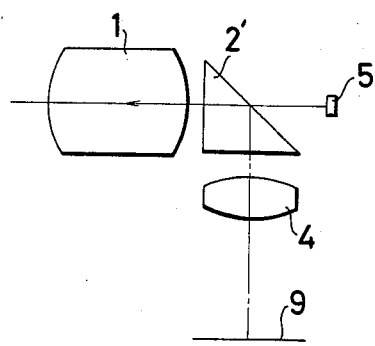
FIG. 7 is a sectional view of another embodiment of the optical system.

FIG. 7, illustrates a modification of the arrangement of FIG. 1, where an infrared light-permeable, visible light-reflective dichroic film is deposited on an inclined surface of a beam splitter 2'.

In the foregoing embodiments, to obtain the spectral transmittance characteristic of FIG. 6, by applying a coating on one of the lens surfaces of the rear group 4, it is preferred to choose that lens surface which has a large radius curvature (for example, more than 50 times the focal length), because the thickness of the coating can be controlled with such great accuracy that color uniformity is ensured over the entire area thereof.

As has been described above, according to the present invention, the spectral transmittance characteristics of the front and rear parts of the photographic optical system are differentiated from each other, with the advantages of preventing a loss of the amount of light when measuring the object distance, improving the accuracy of distance measurement, and extending the measurable distance target area. Also, when photographing, a proper color reproduction is obtained.

Further, because the spectral energy reaching the sensitive surface becomes the same as that in the general photographic optical systems, a proper exposure value can be obtained when measuring light without the necessity of using a sensitivity changeover means or the like.

What is claimed is:

1. A photographic optical system comprising:
   (a) objective optical means having an optical path;
   (b) optical path splitting means arranged on the image side of said objective optical means for splitting said optical path into a first split part and a second split part;
   (c) image receiving means arranged on the first split part of the optical path to receive an image of an object;
   (d) rear optical means arranged between said optical path splitting means and said image receiving means;
   (e) a pair of units for respectively projecting onto the object light of a first wavelength region, and for receiving the light of the first wavelength region reflected from the object, one of said pair of units being arranged on said second split part and the light of the first wavelength region passing through said objective optical means; and
   (f) detection means for detecting whether or not the object image is focussed on said image receiving means on the basis of the light intensity distribution of the light of the first wavelength region through the light receiving unit, wherein the superimposed characteristic of the spectral transmittance characteristic of said objective optical means and the spectral transmittance characteristic of said rear optical means matches the sensitivity characteristic of said image receiving means, and in said first wavelength regions, the spectral transmittance of said objective optical means is larger than the spectral trnasmittance of said rear optical means.

2. A photographic optical system according to claim 1, wherein said one of said pair of units arranged on said second split part is a light source for issuing a beam of the first wavelength regions, and the other of the pair of units includes a convergent lens and photo-sensing means for sensing the reflection of the beam from the object.

3. A photographic optical system according to claim 1, wherein said one of said pair of units arranged on said second split part is photo-sensing means, and the other of the pair of untis includes a convergent lens and a light source for issuing a beam of the first wavelength region.

4. A phjotographic optical optical system according to claim 1, further comprising second optical path splitting means arranged between said objective optical means and said rear optical means to split the optical path into a third split part, and wherein the other of said pair of units is arranged on the third split part of the optical path, and said one of said pair of units is a light source for issuing a beam of the first wavelength region and the other of said pair of units is photo-sensing means for sensing the reflection of the beam from the object.

5. A photographic optical system according to calim 1, wherein said first wavelength region is included between 700 nm and 1000 nm.

6. A photographic optical system comprising:
(a) objective optical means having an optical path;
(b) optical path splitting means arranged on the image side of said objective optical means for splitting said optical path;
(c) image receiving means arranged on one of the split parts of the optical path to receive an image of an object;
(d) a light source for emitting a light beam of invisible wavelength region and a light detector for receiving said light beam reflected from said object for detecting whether or not the image of the object is focussed on the image receiving means, at least one of said light source and light detector being located on another of the split parts of said optical path; and
(e) rear optical means arranged between said optical path splitting means and said image receiving means, wherein the superimposed characteristic of the spectral transmittance characteristic of said objective optical means and the spectral transmittance characteristic of said rear optical means matches the sensitivity characteristic of said image receiving means, and in said invisible wavelength region the spectral transmittance of said objective optical means is larger than the spectral transmittance of said rear optical means.

7. A photographic optical system according to claim 6, wherein said objective optical means and said rear optical means comprise an image forming lens.

8. A photographic optical system according claim 6, wherein said rear optical means is a filter.

9. A photographic optical system according to claim 6, wherein
said rear optical means is a thin layer coating.

10. A photographic optical system according to claim 6, wherein
said optical path splitting means is a wavelength selecting mirror.

* * * * *